(12) United States Patent
Liu et al.

(10) Patent No.: US 9,836,156 B2
(45) Date of Patent: Dec. 5, 2017

(54) IN-CELL TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Xiaoliang Ding, Beijing (CN); Shengji Yang, Beijing (CN); Chunlei Wang, Beijing (CN); Liguang Deng, Beijing (CN); Yafeng Duan, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 23 days.

(21) Appl. No.: 14/435,953

(22) PCT Filed: Aug. 29, 2014

(86) PCT No.: PCT/CN2014/085530
§ 371 (c)(1),
(2) Date: Apr. 15, 2015

(87) PCT Pub. No.: WO2015/135304
PCT Pub. Date: Sep. 17, 2015

(65) Prior Publication Data
US 2016/0139719 A1    May 19, 2016

(30) Foreign Application Priority Data

Mar. 12, 2014    (CN) .......................... 2014 1 0090148

(51) Int. Cl.
*G06F 3/041* (2006.01)
*G02F 1/1333* (2006.01)
(Continued)

(52) U.S. Cl.
CPC ........ *G06F 3/0416* (2013.01); *G02F 1/13338* (2013.01); *G02F 1/133509* (2013.01);
(Continued)

(58) Field of Classification Search
None
See application file for complete search history.

(56) References Cited

U.S. PATENT DOCUMENTS 9,372,564 B2    6/2016  Wang et al.
2013/0050864 A1*  2/2013  Lin .................. G02F 1/133512
                                                359/891
(Continued)

FOREIGN PATENT DOCUMENTS

CN    102004343 A    4/2011
CN    102566819 A    7/2012
(Continued)

OTHER PUBLICATIONS

First Chinese Office Action dated Apr. 13, 2016; Appln. No. 201410090148.9.
(Continued)

*Primary Examiner* — Ifedayo Iluyomade
(74) *Attorney, Agent, or Firm* — Ladas & Parry LLP (57) ABSTRACT

An in-cell touch panel and a display device are provided. The in-cell touch panel includes an array substrate (100) and a counter substrate (200), with a black matrix pattern (210) provided on the array substrate (100) or the counter substrate (200). A common electrode layer (110) of the array substrate (100) includes a plurality of first touch electrodes (111) and a plurality of common electrodes (112) that are insulated from each other; the counter substrate (200) comprises a plurality of second touch electrodes (220), projections of the second touch electrodes (220) on the array substrate (100) lie within regions where the common electrodes (112) are
(Continued)

located. Regions of the first touch electrodes (111) corresponding to the black matrix pattern (210) protrude toward the counter substrate (200) entirely or in part, and/or regions of the second touch electrodes (220) corresponding to the black matrix pattern (210) protrude toward the array substrate (100) entirely or in part. With the touch panel, the sensitivity of touch can be enhanced.

20 Claims, 5 Drawing Sheets (51) Int. Cl.
      *G02F 1/1335*     (2006.01)
      *G06F 3/044*     (2006.01)
(52) U.S. Cl.
      CPC ............ *G06F 3/044* (2013.01); *G06F 3/0412* (2013.01); *G06F 2203/04103* (2013.01)

(56) References Cited

U.S. PATENT DOCUMENTS

| | | | | |
|---|---|---|---|---|
| 2013/0127747 A1* | 5/2013 | Ding | .................... | G06F 3/0412 345/173 |
| 2014/0118299 A1* | 5/2014 | Wang | .................... | G06F 3/0416 345/174 |
| 2014/0306916 A1* | 10/2014 | Wang | .................... | G06F 3/041 345/173 |
| 2015/0060252 A1 | 3/2015 | Wang et al. | | |

FOREIGN PATENT DOCUMENTS

| | | | | |
|---|---|---|---|---|
| CN | 102914920 | A | 2/2013 | |
| CN | 20131012613 | * | 4/2013 | ............ G06F 3/041 |
| CN | 103218097 | A | 7/2013 | |
| CN | 103226412 | A | 7/2013 | |
| CN | 103309503 | A | 9/2013 | |
| CN | 203178998 | A | 9/2013 | |
| CN | 103885637 | A | 6/2014 | |
| CN | 203733088 | U | 7/2014 | |
| DE | EP 2985677 | * | 9/2013 | ............ G06F 3/041 |
| JP | 2005-121805 | A | 5/2005 | |
| KR | 20130131062 | A | 12/2013 | |

OTHER PUBLICATIONS

International Search Report and Written Opinion dated Dec. 17, 2014; PCT/CN2014/085530.

International Search Report dated Nov. 27, 2014; PCT/CN2014/085530.

Written Opinion of the International Searching Authority dated Dec. 8, 2014; PCT/CN2014/085530.

Third Chinese Office Action dated Dec. 13, 2016; Appln. No. 201410090148.9.

The Extended European Search Report dated Sep. 8, 2017; Appln. No. 14859291.8.

* cited by examiner

IN-CELL TOUCH PANEL AND DISPLAY DEVICE

TECHNICAL FIELD

At least one embodiment of the present invention relates to an in-cell touch panel and a display device.

BACKGROUND

As for an in-cell touch panel, touch electrodes of the touch panel are embedded inside a liquid crystal display panel, so as to decrease the overall thickness of the module, and reduce the production costs of the touch panel.

The Advanced Super Dimension Switch (ADS) technology is a kind of liquid crystal display technologies that can be used for realizing wide view angle, by which, a multi-dimensional electric field is formed by an electric field produced at edges of slit electrodes on the same plane and an electric field produced between a layer of the slit electrodes and a layer of a plate-like electrode, so as to allow liquid crystal molecules at all orientation within a liquid crystal cell, which are located directly above the electrode and between the slit electrodes, to be rotated, and thereby the work efficiency of liquid crystals is enhanced and the transmissive efficiency is increased. H-ADS (high opening ratio-ADS) is an important implementing mode of the ADS technology.

At present, an in-cell touch panel structure proposed on the basis of an ADS technology (e.g., H-ADS technology) is that, a common electrode layer in a whole plane in an array substrate is divided so as to form touch driving electrodes and common electrodes that are insulated from each other and disposed in a crossing manner, and touch sensing electrodes corresponding to regions where the common electrodes are located are provided on a counter substrate. The touch driving electrodes are driven in a time-division manner, so as to achieve a touch-control function and a display function.

SUMMARY

According to at least one embodiment of the present invention, there are provided an in-cell touch panel and a display device, for improving the sensitivity of touch-control of the touch panel.

An in-cell touch panel provided by at least one embodiment of the present invention includes an array substrate having a common electrode layer, and a counter substrate disposed in opposition to the array substrate, with a black matrix pattern provided on the array substrate or the counter substrate; the common electrode layer includes a plurality of first touch electrodes and a plurality of common electrodes that are insulated from each other, the first touch electrodes and the common electrodes are disposed in a crossing manner; the counter substrate comprises a plurality of second touch electrodes, projections of the second touch electrodes onto the array substrate lie within regions where the common electrodes are located; regions of the first touch electrodes corresponding to the black matrix pattern protrude toward the counter substrate entirely or in part, and/or regions of the second touch electrodes corresponding to the black matrix pattern protrude toward the array substrate entirely or in part.

According to at least one embodiment of the present invention, there is provided a display device, including the above in-cell touch panel provided by embodiments of the invention.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but are not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

The thickness and shape of film layers in drawings do not reflect the true scale, and the purpose is merely to schematically illustrate contents of embodiments of the present invention.

As noted by inventors of the present application, touch sensing electrodes in an in-cell touch panel proposed on the basis of an ADS technology (e.g., H-ADS technology) are generally prepared by using a metallic material; in order not to affect the normal display function, touch sensing electrodes are generally made to be in a grid-like electrode structure sheltered by a black matrix pattern in a counter substrate; due to the restriction on the width of the black matrix, line-widths of the grid-like electrode structure (whether in the longitudinal direction or in the transverse direction) cannot be too big. When a common electrode layer is multiplexed as touch driving electrodes, only a part of the common electrode layer serves as the touch driving electrodes. All these structural designs may cause the mutual capacitance between touch driving electrodes and touch sensing electrodes to be relatively smaller, and a variation induced by a touch of a finger is relatively smaller as well. In turn, the sensitivity of touch is disadvantageously affected.

According to at least one embodiment of the present invention, there is provided an in-cell touch panel, which includes an array substrate having a common electrode layer, and a counter substrate disposed in opposition to the array substrate, with a black matrix pattern provided on the array substrate or the counter substrate. The common electrode layer includes a plurality of first touch electrodes and a plurality of common electrodes that are insulated from each other, the first touch electrodes and the common electrodes are disposed in a crossing manner; the counter substrate comprises a plurality of second touch electrodes, projections of the second touch electrodes onto the array substrate lie within regions where the common electrodes are located; regions of the first touch electrodes corresponding to the black matrix pattern protrude toward the counter substrate entirely or in part, and/or regions of the second touch electrodes corresponding to the black matrix pattern protrude toward the array substrate entirely or in part.

In the in-cell touch panel provided by embodiments of the invention, the first touch electrodes may be touch driving electrodes, the second touch electrodes are touch sensing electrode; or, the first touch electrodes may be touch sensing electrodes, the second touch electrodes are touch driving electrode. The following embodiments will be described with reference to an example in which the first touch electrodes are touch driving electrodes, and the second touch electrodes are touch sensing electrodes.

Figure 1:
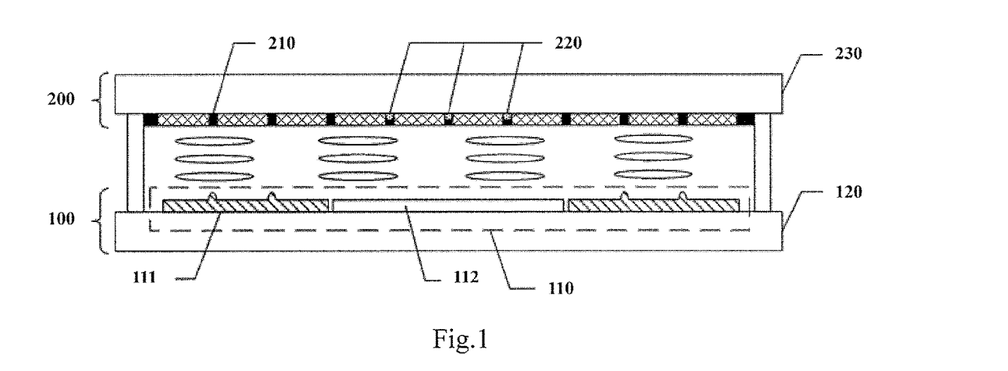
FIG. 1 is a structurally schematic view illustrating an in-cell touch panel provided by an embodiment of the invention.

FIG. 1 is a schematically cross-sectional view illustrating an in-cell touch panel provided by an embodiment of the present invention. An in-cell touch panel provided by an embodiment of the invention, as shown in FIG. 1, includes an array substrate 100 having a common electrode layer 110, and a counter substrate 200 disposed in opposition to the array substrate 100. A black matrix pattern 210 is provided on the array substrate 100 or the counter substrate 200, and illustration is given with reference to an example in which the black matrix pattern 210 is provided on the counter substrate 200 in FIG. 1.

Figure 2:
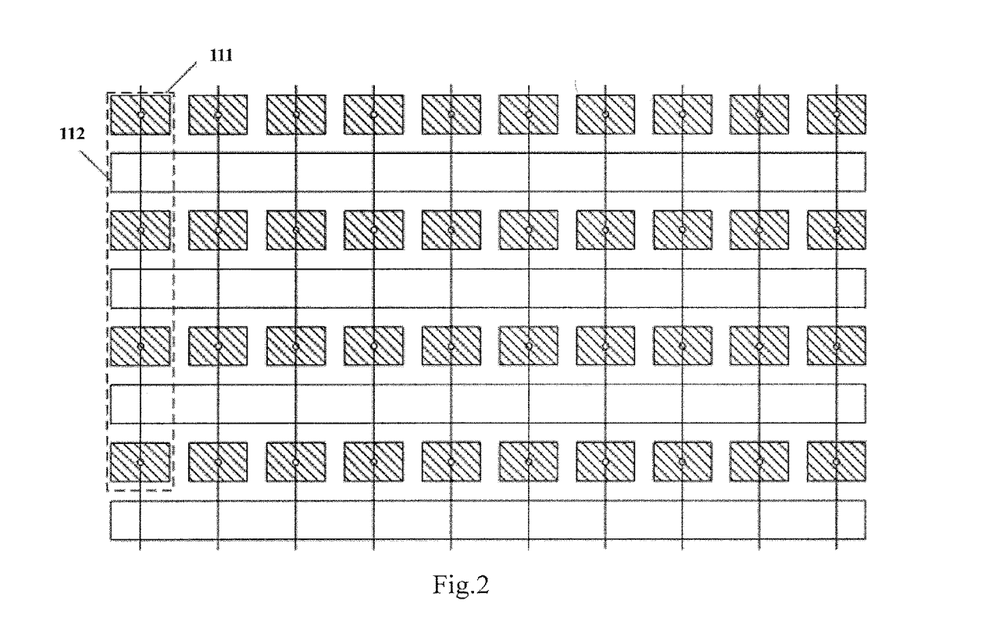
FIG. 2 is a structurally schematic view illustrating a common electrode layer in an in-cell touch panel provided by an embodiment of the invention.

In one embodiment, as shown in FIG. 2, the common electrode layer 110 of the array substrate 100 includes a plurality of touch driving electrodes 111 and a plurality of common electrodes 112 insulated from each other, and the touch driving electrodes 111 and the common electrodes 112 are disposed in a crossing manner. In the figure, the common electrodes 112 extend horizontally, and touch driving electrodes 111 separated by the common electrodes 112 are electrically connected to each other through wires, so as to extend longitudinally as a whole. Regions of touch driving electrodes 111 corresponding to the black matrix pattern 210 protrude toward the counter substrate 200 entirely or in part. In one embodiment, the touch driving electrodes 111 may adopt a way of time-division driving, so as to achieve both a touch-control function and a display function. For example, during the time when one frame of picture is displayed, each touch driving electrode 111 is useful for loading of a common electrode signal and a touch scanning signal in a time-sharing manner.

In one embodiment, where the first touch electrodes are touch sensing electrodes, and the second touch electrodes are touch driving electrodes, in a time period for display, the touch driving electrodes may be configured to be suspended, and a signal Vcom (a common electrode signal) may be put into the touch sensing electrodes normally. In a time period for touch, it is possible that a touch driving voltage signal is applied to the touch driving electrodes, and the voltage Vcom across the common electrodes underlying the touch driving electrodes is regulated, so that the voltage difference produced by the combination of the driving voltage across the touch driving electrode and the common voltage across the common electrode underlying the touch driving electrode with a pixel voltage is in accordance with the voltage difference between the voltage Vcom and the pixel voltage at a display stage. A signal for touch sensing electrodes Rx is the voltage Vcom or a stable voltage at 1V or so.

In one embodiment, the counter substrate 200 comprises a plurality of second touch electrodes, such as touch sensing electrodes 220. Orthogonal projection of each touch sensing electrode 220 onto the array substrate 100 lies within the region where a common electrode 112 is located, and the touch sensing electrodes 220 are basically flat.

In one embodiment, regions of touch driving electrodes 111 corresponding to the black matrix pattern 210 on the array substrate 100 are basically flat, and regions of touch sensing electrodes 220 corresponding to the black matrix pattern on the counter substrate 200 protrude toward the array substrate entirely or in part.

In one embodiment, regions of touch driving electrodes 111 corresponding to the black matrix pattern 210 on the array substrate 100 may protrude toward the counter substrate 200 entirely or in part, and regions of touch sensing electrodes 220 corresponding to the black matrix pattern on the counter substrate 200 may protrude toward the array substrate entirely or in part.

With respect to the above in-cell touch panel provided by embodiments of the invention, a common electrode layer in a whole plane in an array substrate is divided so as to form a plurality of first touch electrodes and a plurality of common electrodes that are insulated from each other and disposed in a crossing manner; second touch electrodes are provided on a counter substrate, and projection of each second touch electrode onto the array substrate lies within the region where a common electrode is located. Because regions of first touch electrodes corresponding to the black matrix pattern within the touch panel provided by embodiments of the invention protrude toward the counter substrate entirely or in part, and/or regions of second touch electrodes corresponding to the black matrix pattern protrude toward the array substrate entirely or in part, the area of a touch driving electrode and/or a touch sensing electrode can be increased without affecting the aperture ratio of the touch panel. Thus, the capacitance of a touch driving electrode projected to a touch sensing electrode (namely, the mutual capacitance between the touch driving electrode and the touch sensing electrode) is increased. This raises the degree of the variation induced by a touch of a finger, and in turn, the sensitivity of touch is enhanced.

Because a time-division driving manner can be adopted at the touch and display stages in the above touch panel provided by embodiments of the invention, in one embodiment, chips configured for display driving and touch driving can be integrated into one, so as to reduce the production costs. On the other hand, the mutual interference between display and touch can also be reduced by the time-division driving, so as to improve the picture quality and the accuracy of touch. However, embodiments of the invention are not limited thereto, and chips for display driving and touch driving may also be provided independently of each other.

Figure 3:
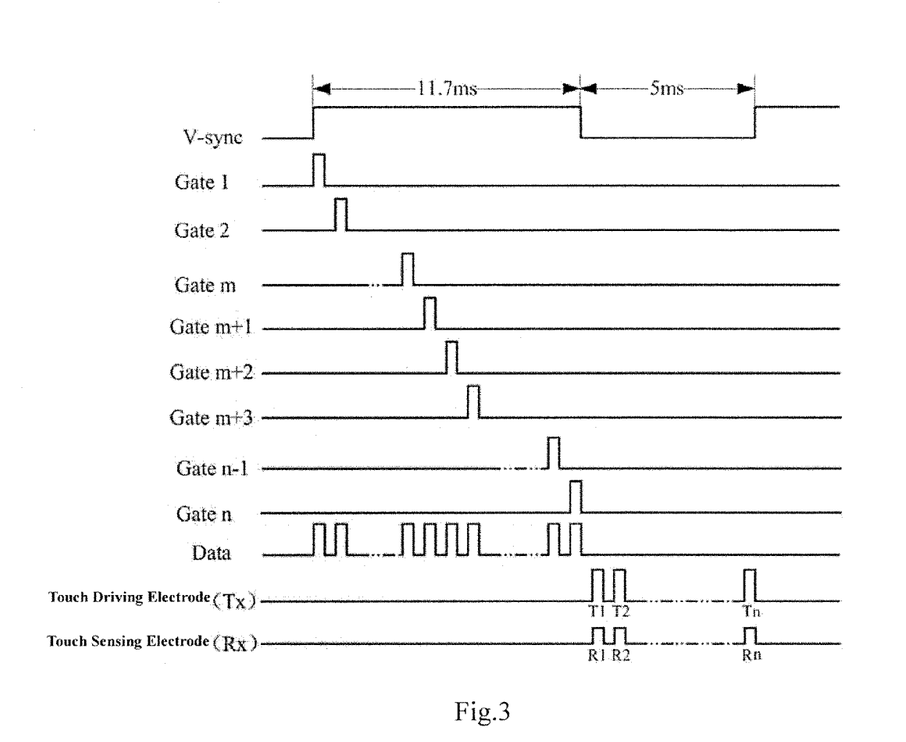
FIG. 3 is a diagram illustrating the drive timing of an in-cell touch panel provided by an embodiment of the invention.

For example, in the drive timing diagram shown in FIG. 3, the time for display of each frame (V-sync) of the touch panel is divided into a display time period and a touch time period. For example, the time for display of one frame of the touch panel in the drive timing diagram shown in FIG. 3 is 16.7 ms, 5 ms of which is chosen as the touch time period, and the remaining 11.7 ms serves as the display time period. Of course, the durations of the two periods may also be appropriately adjusted according to the processing capacity of an IC chip, and they will not be specifically limited here. During the display time period, a gate scanning signal is applied to each of gate signal lines Gate1, Gate2, . . . Gate n in the touch panel in sequence, and a gray-scale signal is applied to a data signal line Data. Accordingly, at this time, touch driving electrodes Tx serve as common electrodes, and a constant common electrode signal is provided to them by an IC chip connected to the touch driving electrodes, so as to achieve a liquid crystal display function. During the touch time period, touch scanning signals T1, T2 . . . Tn are provided to each touch driving electrode by an IC chip connected to the touch driving electrodes, respectively, and meanwhile detection of touch sensing signals R1, R2 . . . Rn is performed on each touch sensing electrode, respectively, so as to achieve a touch control function. During the touch time period, no signal is input into each of the gate signal lines and the data signal line in the touch panel. A common electrode signal is always applied to each common electrode in the common electrode layer during the display time period and the touch time period, or, during the display time period, a common electrode signal is applied to each common electrode, and during the touch time period, each common electrode is grounded or configured to be suspended, which means that there is no signal input thereto.

Figure 5:
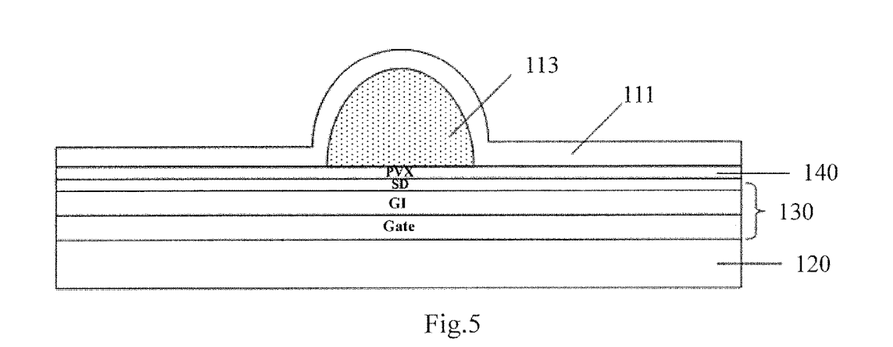
FIG. 5 is a sectional view taken along line a-a in FIG. 4.

For example, in order to allow regions of touch driving electrodes 111 corresponding to the black matrix pattern 210 to protrude toward the counter substrate 200 entirely or in part, that is, for enabling regions of touch driving electrodes 111 corresponding to the black matrix pattern 210 to bulge, in one embodiment, as shown in FIG. 5, a first raised portion 113 configured for supporting the protrusion of the touch driving electrode 111 toward the counter substrate may be set at a corresponding place on the array substrate 100. The projection of the first raised portion 113 on the array substrate 100 lies within a region corresponding to the black matrix pattern 210, and thus it will not affect the normal display of the touch panel.

In one example, in order to enable the first raised portion 113 to support the protrusion of the touch driving electrode 111, the first raised portion 113 may be arranged underneath the portion of the touch driving electrode 111 needed to bulge. In one example, in order that the first raised portion 113 does not affect patterning of other film layers in the array substrate, the first raised portion 113 may be in direct contact with the touch driving electrode 111, that is, there may be no other film layer between the first raised portion 113 and the touch driving electrode 111. For example, as shown in FIG. 5, the array substrate 100 usually comprises a thin film transistor 130 disposed on a first base substrate 120, an insulating layer 140 is usually provided between a common electrode layer 110 (the touch driving electrode 111) and the thin film transistor 130, and the first raised portion 113 may be located between the insulating layer 140 and the touch driving electrode 111.

In a different embodiments, in view of the fact that the first raised portion 113 may be in direct contact with the touch driving electrode 111, in order that the first raised portion 113 does not affect the signal transmission on the touch driving electrode 111, the first raised portion 113 may be fabricated by using a semiconductor material or an insulating material. For example, the first raised portion 113 may be fabricated by using a silicon sphere, and no limit will be set here.

Figure 4:
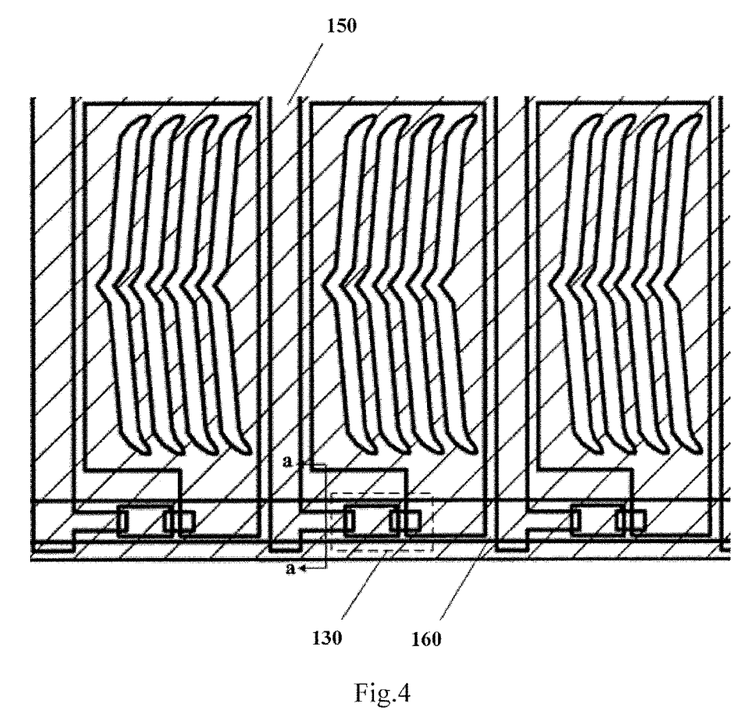
FIG. 4 is a view illustrating the detailed structure of an array substrate in an in-cell touch panel provided by an embodiment of the invention.

As shown in FIG. 4, the array substrate 100 further comprises a data line 150 connected to the drain electrode of the thin film transistor 130, and a gate line 160 connected to the gate electrode of the thin film transistor 130. The thin film transistor 130, the data line 150 and the gate line 160 may all be sheltered by the black matrix pattern 210. Therefore, in a different embodiments, the first raised portion 113 may be disposed merely in a region corresponding to the data line 150, or may be disposed merely in a region corresponding to the gate line 160, and it may also be possible that the first raised portion 113 is disposed in each of regions corresponding to the thin film transistor 130, the data line 150 and the gate line 160. A section taken along line a-a in FIG. 4 is illustrated as an example in FIG. 5. Correspondingly, as shown in FIG. 5, the region of the touch driving electrode 111 disposed above the first raised portion 113 protrudes over the other region, so that the unit area of the touch driving electrode 111 here is larger than the unit area in other region. Thus, the overall area of the touch driving electrode 111 is increased.

In a touch panel provided by various embodiments of the invention, a black matrix pattern 210 is generally provided on a second base substrate 230 of the counter substrate 200, touch sensing electrodes 220 may be located between the second base substrate 230 and the black matrix pattern 210, or may be located over the black matrix pattern 210. No limit will be set here.

In one embodiment, the position of touch sensing electrodes 220 corresponds to the position of common electrodes 112, and so, directly facing area between the touch sensing electrodes 220 and touch driving electrodes 111 can be prevented from producing. The resolution of a touch panel is usually on the order of millimeter, and the resolution of a liquid crystal display panel is usually on the order of micron, and it can be understood that the required resolution for display is far greater than the required resolution for touch. Therefore, each of touch driving electrodes 111 and each of common electrodes 112 each correspond to rows of pixel units in general. The gap between touch sensing electrodes 220 may be set according to the required touch resolution, namely, it is only necessary to make sure that the projection of each touch sensing electrode 220 onto the array substrate 100 lies within the region where a common electrode 112 is located. For example, the width of each touch sensing electrode 220 may be no greater than the width of a common electrode 112; and for example, the touch sensing electrodes 220 may also be disposed with at least one common electrode 112 interposed therebetween. For example, it is possible that touch sensing electrodes 220 and common electrodes 112 are arranged to have a relationship of one to one correspondence, and no limit will be set here.

Figure 6A:
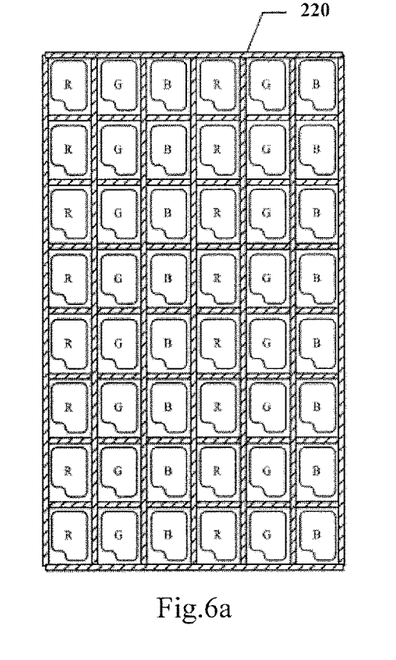
FIG. 6a and FIG. 6b are schematic views illustrating touch sensing electrodes in a grid-like electrode structure in an in-cell touch panel provided by embodiments of the invention.
Figure 6B:
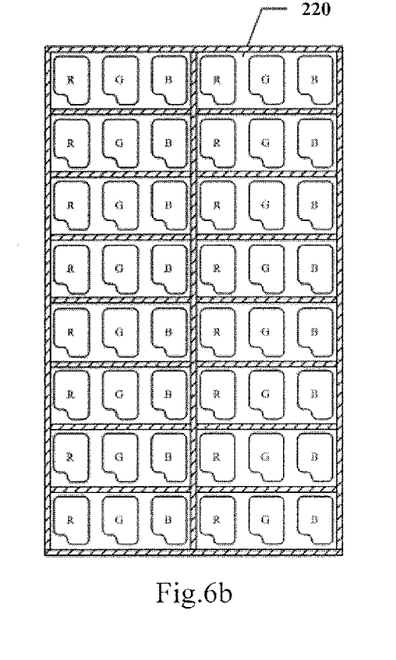

In one embodiment, in order to make sure that the aperture ratio and the light transmittance of each pixel unit are not affected by each touch sensing electrode 220, it is possible that touch sensing electrodes 220 are arranged to have a grid-like electrode structure, and the grid-like electrode structure of the touch sensing electrodes 220 is covered by a black matrix pattern 210. In this way, it is possible to avoid the influence on aperture ratio of a display and avoid the influence on light transmittance of the display by means of covering the grid-like electrode structure of touch sensing electrodes 220 with the black matrix pattern 210. In a different embodiment, the mesh size of the grid-like electrode structure of touch sensing electrodes 220 may be determined according to specific requirements. For example, as shown in FIG. 6a, the pattern of touch sensing electrodes 220 may be set to be located at the gap between sub-pixel units (RGB) for forming a pixel unit, and the pattern of touch sensing electrodes 220 may also be set, as shown in FIG. 6b, only to be located at the gap between pixel units, no limit being set here.

In a different embodiment, in view of the fact that touch sensing electrodes 220 in a grid-like electrode structure provided on a counter substrate 200 may not shield pixel units, the material for the touch sensing electrodes 220 may be a transparent conductive oxide (e.g., ITO or IZO), and may also be a metal material. When metal is used for manufacture of a touch sensing electrode, its resistance can be reduced effectively.

In one embodiment, in order to make sure that a larger mutual capacitance can be formed between each touch sensing electrode 220 and a touch driving electrode 111, touch sensing electrodes 220 may be arranged to be in a sheet-like structure, so that a pixel region is flatter than the grid-like electrode structure. For example, the touch sensing electrodes 220 in a sheet-like structure may be fabricated by using a transparent conductive material, and so, the touch sensing electrodes 220 will not affect aperture ratio of each pixel unit as well.

In one embodiment, when touch sensing electrodes 220 are of a sheet-like structure, in order to increase the mutual capacitance between a touch sensing electrode 220 and a touch driving electrode 111 by means of further increasing the unit area of the touch sensing electrode 220, similar to a touch driving electrode 111, the touch sensing electrode 220 may also be designed in such a way that its regions corresponding to a black matrix pattern 210 protrude toward an array substrate 100 entirely or in part, so that the unit area of the touch sensing electrode 220 in regions of the black matrix pattern 210 is larger than the unit area in other regions. Thus, the overall area of the touch sensing electrode 220 is increased. Of course, touch sensing electrodes 220 in embodiments of the invention are not limited to the sheet-like structure, and any structure is acceptable as long as it is usable for enabling regions of touch sensing electrodes 220 corresponding to the black matrix pattern 210 to protrude toward the array substrate 100 entirely or in part.

Figure 7:
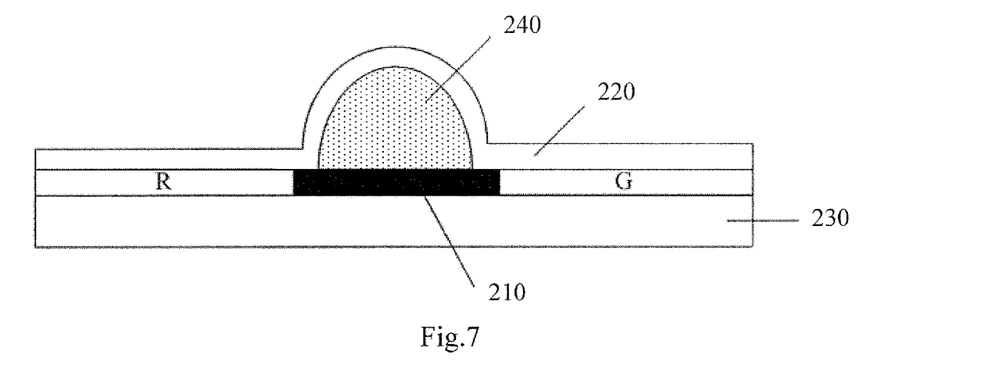
FIG. 7 is a structurally schematic view illustrating a counter substrate, in the case that touch sensing electrodes in an in-cell touch panel provided by an embodiment of the invention are of a sheet-like structure.

For example, for enabling regions of touch sensing electrodes 220 corresponding to a black matrix pattern 210 to protrude toward an array substrate 100 entirely or in part, namely, for enabling regions of the touch sensing electrode 220 corresponding to the black matrix pattern 210 to bulge, in one embodiment, as shown in FIG. 7, a second raised portion 240 configured for supporting the protrusion of the touch sensing electrode 220 toward the array substrate 100 may be provided on a counter substrate 100. The second raised portion 240 is covered by the black matrix pattern, and thus will not affect the normal display function of the touch panel.

In one embodiment, in order to enable the second raised portion 240 to support protrusion of the touch sensing electrode 220, the second raised portion 240 may be arranged underneath the portion of the touch sensing electrode 220 needed to bulge. In one example, in order that the second raised portion 240 does not affect patterning of other film layers in a counter substrate 200, the second raised portion 240 may be in direct contact with the touch sensing electrode 220, that is, there may be no other film layer between the second raised portion 240 and the touch sensing electrode 220. For example, when the touch sensing electrode 220 is located over a black matrix pattern 210, the second raised portion 240 is located between the touch sensing electrode 220 and the black matrix pattern 210, as shown in FIG. 7; for example, when the touch sensing electrode 220 is located between a black matrix pattern 210 and a second base substrate 230, the second raised portion 240 is located between the second base substrate 230 and the touch sensing electrode 220.

In a different embodiment, in view of the fact that the second raised portion 240 is in direct contact with the touch sensing electrode 220, in order that the second raised portion 240 does not affect the signal transmission over the touch sensing electrode 220, the second raised portion 240 may be fabricated by using a semiconductor material or an insulating material. For example, the second raised portion 240 may be fabricated by using a silicon sphere, and no limit will be set here.

Based on the same inventive concept, according to at least one embodiment of the invention, there is further provided a display device, which includes the above in-cell touch panel provided by embodiments of the invention. The display device may be a cell phone, a tablet computer, a television, a display, a notebook computer, a digital photo frame, a navigator, or any other product or component having a display function. As regards implementation of the display device, reference to embodiments of the in-cell touch panel as mentioned above can be made, and repetitions are omitted here.

With respect to an in-cell touch panel and a display device provided by at least one embodiment of the present invention, a common electrode layer in a whole plane in an array substrate is divided so as to form a plurality of first touch electrodes and a plurality of common electrodes that are insulated from each other and disposed in a crossing manner; second touch electrodes are provided on a counter substrate, and the projection of each second touch electrode onto the array substrate lies within the region where a common electrode is located. Because regions of first touch electrodes corresponding to the black matrix pattern within the touch panel provided by embodiments of the invention protrude toward the counter substrate entirely or in part, and/or regions of second touch electrodes corresponding to the black matrix pattern protrude toward the array substrate entirely or in part, the area of a touch driving electrode and/or a touch sensing electrode can be increased without affecting the aperture ratio of the touch panel. Thus, the capacitance of a touch driving electrode projected to a touch sensing electrode (namely, the mutual capacitance between the touch driving electrode and the touch sensing electrode) is increased. This raises the degree of variation induced by touch of a finger, and in turn, the sensitivity of touch is enhanced.

Apparently, various modifications and variants can be made to the present invention by those skilled in the art without departing from the spirit and scope of the invention. As such, provided that these modifications and variants of the invention fall into the scope of claims of the invention and equivalent technologies thereof, it is intended to embrace them within the invention as well.

This application claims the benefit of priority from Chinese patent application No. 201410090148.9, filed on Mar. 12, 2014, the disclosure of which is incorporated herein in its entirety by reference as a part of the present application.

What is claimed is:

1. An in-cell touch panel, comprising an array substrate having a common electrode layer, and a counter substrate disposed in opposition to the array substrate, with a black matrix pattern provided on the array substrate or the counter substrate, wherein the common electrode layer includes a plurality of first touch electrodes and a plurality of common electrodes that are insulated from each other, the first touch electrodes and the common electrodes are disposed in a crossing manner; the counter substrate comprises a plurality of second touch electrodes, projections of the second touch electrodes onto the array substrate are opposite of where the common electrodes are located; regions of the first touch electrodes corresponding to the black matrix pattern protrude toward the counter substrate entirely or in part more than regions of the first touch electrodes not corresponding to the black matrix pattern, and/or regions of the second touch electrodes corresponding to the black matrix pattern protrude toward the array substrate entirely or in part more than regions of the second touch electrodes not corresponding to the black matrix pattern; the array substrate comprises first raised portions configured for supporting a protrusion of the first touch electrodes toward the counter substrate, and a projection of the first raised portions on the array substrate are opposite a region corresponding to the black matrix pattern; and the array substrate comprise a thin film transistor provided on a first base substrate; there is an insulating layer between the first touch electrode and the thin film transistor, and the first raised portions are located between the insulating layer and the first touch electrodes.

2. The in-cell touch panel claimed as claim 1, wherein the first touch electrodes are touch driving electrodes, the second touch electrodes are touch sensing electrodes; or
the first touch electrodes are touch sensing electrodes, the second touch electrodes are touch driving electrodes.

3. The in-cell touch panel claimed as claim 1, wherein where the first touch electrodes are touch driving electrodes, within a time period for display of one frame of picture, each of the first touch electrodes is configured for loading of a common electrode signal and a touch scanning signal in a time-sharing manner.

4. The in-cell touch panel claimed as claim 1, wherein a material for the first raised portions is silicon sphere.

5. The in-cell touch panel claimed as claim 1, wherein the black matrix pattern is provided on a second base substrate of the counter substrate, and
the second touch electrodes are located between the black matrix pattern and the second base substrate, or located over the black matrix pattern.

6. The in-cell touch panel claimed as claim 5, wherein the second touch electrodes comprises a grid-like electrode structure, and the grid-like electrode structure of the second touch electrodes is covered by the black matrix pattern.

7. The in-cell touch panel claimed as claim 5, wherein the second touch electrodes comprises a sheet-like structure.

8. The in-cell touch panel claimed as claim 5, wherein the counter substrate comprises second raised portions configured for supporting the protrusion of the second touch electrodes toward the array substrate, and the second raised portions are covered by the black matrix pattern.

9. The in-cell touch panel claimed as claim 8, wherein,
where the second touch electrodes are located over the black matrix pattern, the second raised portions are located between the second touch electrodes and the black matrix pattern; or
where the second touch electrodes are located between the black matrix pattern and the second base substrate, the second raised portions are located between the second base substrate and the second touch electrodes.

10. A display device, comprising the in-cell touch panel claimed as claim 1.

11. The in-cell touch panel claimed as claim 6, wherein the counter substrate comprises second raised portions configured for supporting the protrusion of the second touch electrodes toward the array substrate, and the second raised portions are covered by the black matrix pattern.

12. An in-cell touch panel, comprising an array substrate having a common electrode layer, and a counter substrate disposed in opposition to the array substrate, with a black matrix pattern provided on the array substrate or the counter substrate, wherein the common electrode layer includes a plurality of first touch electrodes and a plurality of common electrodes that are insulated from each other, the first touch electrodes and the common electrodes are disposed in a crossing manner; the counter substrate comprises a plurality of second touch electrodes, projections of the second touch electrodes onto the array substrate are opposite of where the common electrodes are located; regions of the first touch electrodes corresponding to the black matrix pattern protrude toward the counter substrate entirely or in part more than regions of the first touch electrodes not corresponding to the black matrix pattern, and/or regions of the second touch electrodes corresponding to the black matrix pattern protrude toward the array substrate entirely or in part more than regions of the second touch electrodes not corresponding to the black matrix pattern; the array substrate comprises first raised portions configured for supporting a protrusion of the first touch electrodes toward the counter substrate, and a projection of the first raised portions on the array substrate are opposite a region corresponding to the black matrix pattern; and a material for the first raised portions is silicon sphere.

13. The in-cell touch panel claimed as claim 12, wherein the first touch electrodes are touch driving electrodes, the second touch electrodes are touch sensing electrodes; or
the first touch electrodes are touch sensing electrodes, the second touch electrodes are touch driving electrodes.

14. The in-cell touch panel claimed as claim 12, wherein where the first touch electrodes are touch driving electrodes, within a time period for display of one frame of picture, each of the first touch electrodes is configured for loading of a common electrode signal and a touch scanning signal in a time-sharing manner.

15. The in-cell touch panel claimed as claim 12, wherein the black matrix pattern is provided on a second base substrate of the counter substrate, and
the second touch electrodes are located between the black matrix pattern and the second base substrate, or located over the black matrix pattern.

16. The in-cell touch panel claimed as claim 15, wherein the second touch electrodes comprises a grid-like electrode structure, and the grid-like electrode structure of the second touch electrodes is covered by the black matrix pattern.

17. The in-cell touch panel claimed as claim 15, wherein the second touch electrodes comprises a sheet-like structure.

18. The in-cell touch panel claimed as claim 15, wherein the counter substrate comprises second raised portions configured for supporting the protrusion of the second touch electrodes toward the array substrate, and the second raised portions are covered by the black matrix pattern.

19. The in-cell touch panel claimed as claim 18, wherein,
where the second touch electrodes are located over the black matrix pattern, the second raised portions are located between the second touch electrodes and the black matrix pattern; or
where the second touch electrodes are located between the black matrix pattern and the second base substrate, the second raised portions are located between the second base substrate and the second touch electrodes.

20. A display device, comprising the in-cell touch panel claimed as claim 12.

* * * * *